(12) United States Patent
Luijten et al.

(10) Patent No.: US 7,103,050 B1
(45) Date of Patent: Sep. 5, 2006

(54) METHOD AND MEANS FOR DETERMINING THE USED BANDWIDTH ON A CONNECTION

(75) Inventors: Ronald P. Luijten, Horgen (CH); Ken V. Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/202,365

(22) PCT Filed: Apr. 10, 1997

(86) PCT No.: PCT/IB97/00394

§ 371 (c)(1),
(2), (4) Date: Dec. 10, 1998

(87) PCT Pub. No.: WO98/46041

PCT Pub. Date: Oct. 15, 1998

(51) Int. Cl.
*H04L 12/56* (2006.01)

(52) U.S. Cl. .................. 370/395.21; 370/222; 370/223; 370/226; 370/395.1; 370/395.2; 370/395.43; 370/236.1; 370/242; 370/468; 370/458

(58) Field of Classification Search .............. 370/222, 370/223, 226, 395.1, 395.2, 395.21, 395.43, 370/536.1, 242, 468, 458
See application file for complete search history.

(56) References Cited

U.S. PATENT DOCUMENTS

| | | | | |
|---|---|---|---|---|
| 5,533,009 A | * | 7/1996 | Chen | 370/17 |
| 5,675,576 A | * | 10/1997 | Kalampoukas et al. | 370/232 |
| 5,754,530 A | * | 5/1998 | Awdeh et al. | 370/232 |
| 5,805,599 A | * | 9/1998 | Mishra et al. | 370/468 |
| 5,889,761 A | * | 3/1999 | Yamato | 370/231 |

OTHER PUBLICATIONS

Shimokoshi, K. "Evaluation of Policing Mechanisms for ATM Networks," IEICE Transactions on Communications, vol. E76–B, No. 11, Nov. 1, 1993.

Shimokoshi, K. "Performance Comparison of Bandwidth Allocation Mechanisms for LAN/MAN Interworking Through an ATM Network," Serving Humanity Through Communications, Supercom/ICC, New Orleans, May 1, 1994, vol. 3, pp. 1405–1411.

Gong et al., "Study of a Two–level Flow Control Scheme and Buffering Strategies," Proceedings of the Conference on Computer Communications, Toronto, Jun. 12, 1994, vol. 3, pp. 1224–1233.

Japanese Publication No. 5–136806 published on Jun. 1, 1993.

Japanese Publication No. 4–329733 published on Nov. 18, 1992.

Japanese Publication No. 5–260072 published on Oct. 8, 1993.

Japanese Publication No. 5–244189 published on Sep. 21, 1993.

* cited by examiner

*Primary Examiner*—Zarni Maung
*Assistant Examiner*—Van Nguyen
(74) *Attorney, Agent, or Firm*—Douglas W. Cameron

(57) ABSTRACT

The invention relates to a method for determining the used bandwidth (CCR) on a connection (18) on which information-carrying units are transported. The duration (ET) of an arrival period, during which a predetermined number (M) of the cells arrives at a certain point of the connection (18), is measured and stored. The bandwidth (CCR) at an arbitrary point of time (GT) is set to the predetermined number (M) per the stored duration (ET), if the point of time (TS) when the duration (ET) was stored is not longer ago than a predetermined threshold time interval (THR) at the arbitrary point of time (GT).

8 Claims, 1 Drawing Sheet ic # METHOD AND MEANS FOR DETERMINING THE USED BANDWIDTH ON A CONNECTION

TECHNICAL FIELD

The invention relates to a method for determining the used bandwidth on a connection and a bandwidth determination means, particularly for the use in cell-based information-transmitting systems, such as ATM systems or switches.

BACKGROUND OF THE INVENTION

In packet-switching systems, e.g. ATM systems, several users are connected via one or more ATM switches. The users exchange information which is transmitted in form of fixed-size packets, also called cells. Since the ATM switch is limited in its capacity to handle cells without loss of information and required to avoid loss of information for certain connections, the cell rate or bandwidth which is allowed to reach the switch is limited. In some ATM systems all users are assigned an equal share of the totally available bandwidth as maximum bandwidth; in other systems users can get different shares assigned. In ATM switches with ABR (Available Bit Rate) service, the unused bandwidth is distributed over the ABR-connections.

Determining the actually used bandwidth is an important aspect for such systems since a deviation from an assigned maximum bandwidth can have various effects: Users may be confronted with additional fees for their assigned bandwidth limit being exceeded. Furthermore, free, unused bandwidth may be at least temporarily assigned to a user who exceeds his assigned bandwidth limit. Finally, queues for arriving cells need to be adapted to the used bandwidth. For all these actions, a precise determination of used bandwidth is of importance.

Two methods are known for determining the actually used bandwidth on a connection.

A first method uses an arrangement that counts the number of arriving cells for a fixed amount of time. The problem is that usually with this method one counter and one timer for each connection is to be established. Furthermore, particularly in the realistic case of a big number of connections, many results of many counting processes have to be stored in very short time, even when less timers are provided. In worst case this may even be simultaneously. Such storage mechanism requires an appropriate provision of reliable and fast resources. This leads to expensive arrangements which still may have only limited capacity. Also, a huge amount of data is to be stored even if no cell traffic is pertinent. Another point is that the timers need to be accessed by two asynchronous processes, namely the cell-receiving process to increment the counter and a timer-based process to set the counter to zero and to read out its value. Such a twofold asynchronously controllable timer needs to be realized with a dual-port RAM which is more expensive than a single port RAM for only one asynchronous access. Also, a queuing mechanism must be implemented between the timer expiration process and the dual-port RAM containing the counters for the case when several timers expire at the same time. This again can only be avoided by providing additional, expensive hardware.

A second method counts a fixed number of cells and measures the elapsed time for these cells. It is here more probable that the storing processes when the number of cells is reached for several connections, do not occur simultaneously. A problem occurs when the number of sent cells remains below the fixed number or if the cell rate falls from a high value to a very low value during a counting process. Then the counting process does not get to an end and no terminating event stops the counting or it takes a very long time until the counting process reaches the fixed number of cells. If this happens, the last value that was used to determine the used bandwidth does no longer represent the correct value of the used bandwidth.

OBJECT AND ADVANTAGES OF THE INVENTION

The following statements refer to fixed-length cells as example. However the invention is also generally applicable for any countable information-carrying unit, such as bits or bytes belonging to a variable-length packet.

It is an object of the invention to provide a method and means for determining the used bandwidth on a connection in a more precise manner. It is another object to provide such a method and means which requires less hardware and less software for achieving a very precise result of the determination. Generally, it is an object to provide a method and means for determining the used bandwidth on a connection which avoids the above described problems of the state of the art.

The method and means for determining the used bandwidth on a connection according to claim 1 shows the advantage that the actual value of the used bandwidth is no longer overestimated which results in more accurate bandwidth determination and as a consequence in a fairer treatment of cell traffic on different connections. The determined bandwidth is more accurate an any arbitrary point of time.

Another advantage is that the necessity of providing a separate timer per connection is avoided.

Furthermore, the invention is advantageous in that idle connections, i.e. connections that do not have cell traffic, do not initiate unnecessary table updates.

Using a predetermined threshold interval for determining how long ago a stored duration of an arrival period has been stored, is a simple and hence easy-to-implement solution for the decision whether to use the stored duration value for determining the bandwidth or not.

In the dependent claims various modifications and improvements of the method and means for determining the used bandwidth on a connection are contained.

Setting the bandwidth value to a fixed value like zero if the point of time when the stored duration was stored is at the arbitrary point of time older than the predetermined threshold time interval brings the advantage that no complicated algorithm need be used for calculating the bandwidth value and that the value zero is a good approach to any possible real value. Generally, also other fixed values than zero can be chosen. It is even thinkable that not a fixed value but a different formula for determining the used bandwidth is used. The choice mainly depends on the choice of the duration of the threshold time interval.

When the point of time when the number of the arriving cells reach the predetermined number, is stored, this time can not only be used for a calculation of the then valid bandwidth value but also for any following calculation, particularly for the next bandwidth determination process.

Using the point of time when the number of the arriving cells reached the predetermined number together with the arbitrary point of time and the predetermined threshold time interval to determine whether the stored duration is at the arbitrary point of time older or not older than predetermined threshold time interval, is advantageous because with a minimum of stored values already a decision can be made if the stored values can be used for the bandwidth determination process or not.

When the value of the predetermined threshold time interval is stored, this value can be used for several bandwidth determination processes and is still variable such that it can be changed for achieving a different result of the bandwidth determination processes. Such change may particularly be done when the cell traffic density is changing over a larger period of time and for initializing and/or optimizing the determination process.

Since bandwidth changes with time it is useful and particularly of advantage when after storing the duration of the arrival period, the duration of the next arrival period is measured and stored and the bandwidth at the arbitrary point of time is set to the predetermined number of the cells per the last-stored duration, if the point of time when the last-stored duration was stored is at the arbitrary point of time not older than the predetermined threshold time interval. Then, for determining the actual value for the used bandwidth, the stored values which serve as basis for the determination process, are updated each time when a more actual set of values is created.

A minimum of storage space is needed if the duration of the previous arrival period is erased or overwritten when the duration of the next arrival period is stored.

No timer is needed for every connection if the point of time when the number of the arriving cells reached the predetermined number, is used together with the point of time when the number of the arriving cells reached the predetermined number the last time, to determine the duration of the arrival period.

The advantage that less storage space is needed can here be achieved by erasing or overwriting the previous point of time when the number of the arriving cells reached the predetermined number by the point of time when the number of the arriving cells reach the predetermined number again.

A very easy-to-implement and low-price storage section can be used if one stores for the connection the predetermined threshold time interval, the last-stored duration and the point of time when the number of the arriving cells reached the predetermined number the last time in a storing means.

The invention shows its advantages particularly if it is used for a plurality of connections, since then the little equipment that is needed for its implementation makes the method and means according to the invention much cheaper than known implementations.

SUMMARY OF THE INVENTION

The invented method for determining the used bandwidth on a connection and the bandwidth determination means are applicable for a method where a fixed number of arriving information-carrying units is counted. The arrival period of these units is measured and stored. At an arbitrary point of time the used bandwidth is calculated as being the fixed number of units divided by the value of the stored duration. This calculation is only defined as the actual value of the used bandwidth if between the point of time when the duration was stored and the arbitrary point of time when the bandwidth is to be calculated, a time-difference is not exceeded. The time difference is defined as a predetermined threshold time interval.

The problem from the state of the art that a previously determined value of the used bandwidth is still considered valid, although the cell traffic on the connection may even have ended is hence solved in that the value of the bandwidth for a connection is tested for its actuality.

DESCRIPTION OF THE DRAWINGS

Examples of the invention are depicted in the drawings and described in detail below by way of example. It is shown in FIG. 1: a block-diagram of a bandwidth determination means according to the invention.

All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Figure 1:
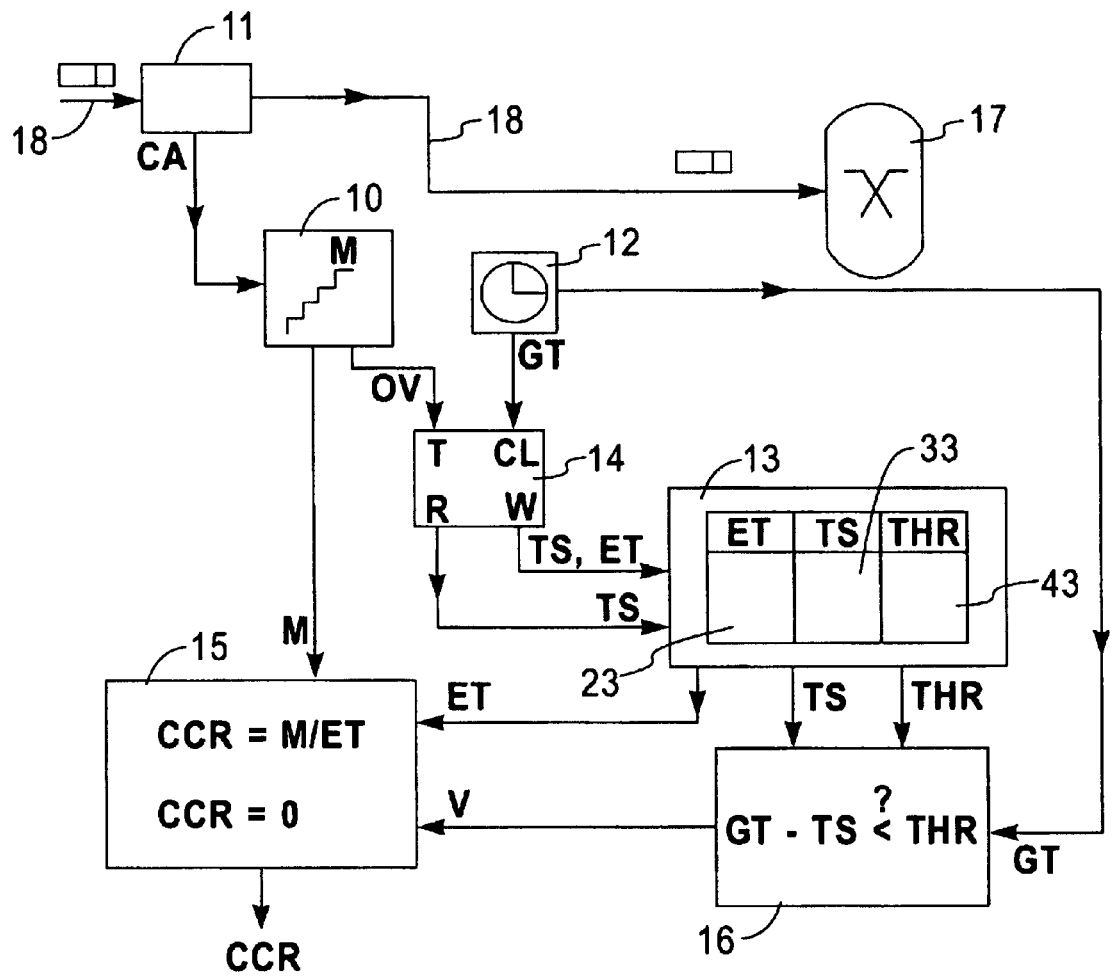

In FIG. 1 a schematic picture of a bandwidth determination means is depicted. It comprises a cell arrival signalisation means 11 which is connected to the input of a counting means 10 and which is situated inmidst a connection 18 that leads to a switching means 17. A time-calculating means 14 is connected via its first input port T to the counting means 10 and via its second input port CL to a timing means 12 which is also connected to an input of a decision means 16. Between the time-calculating means 14 and the decision means 16 is arranged a storing means 13 which has an output line leading to an input of a definition means 15. One line is leading from the storing means 13 to a read input R of the time-calculating means 14 and one line is leading from a write output W of the time-calculating means 14 to the storing means 13. Another input of the definition means 15 is connected to the counting means 10 and a third input of the definition means 15 is connected to the decision means 16. The definition means 15 has one output line.

Cells that contain information are arriving on the connection 18 at the cell arrival signalisation means 11 and are led through it towards the switching means 17. The cell arrival signalisation means 11 creates a cell arrival pulse signal CA, each time one cell arrives. The cell arrival pulse signal CA is used by the counting means 10 to increment a contained counter which counts until it reaches a predetermined number M. When the number M is reached, the counter is automatically reset to zero and begins counting again. Further, the counter then issues an overflow signal OV which enters the time-calculating means 14 at its first input port T, also called trigger input T, and thereby initiates a process in the time-calculating means 14 to determine the point of time when the overflow of the counter occurred. Therefor, the time-calculating means 14 uses the value of a global time signal GT delivered by the timing means 12, e.g. a system clock, which value is read into the time-calculating means 14 when the trigger input T receives the overflow signal OV. The result is an overflow moment GTO in the time-calculating means 14. The overflow moment GTO when the counter reached the predetermined number M is hence determined in the time-calculating means 14.

In the storing means 13 a table is contained which has three columns: a first column 23 which is dedicated for an elapsed time ET, a second column 33 which is dedicated for a timestamp TS and a third column 43 which is dedicated for a threshold time interval THR. Since in this example only one connection 18 is discussed, the table contains only one row.

The time-calculating means 14 receives via its read input R the value that is contained in the second column 33, namely the stored value of the timestamp TS. The timestamp TS is defined as the point of time when the table was updated the last time. By subtracting this timestamp value from the value of the overflow moment GTO, the time-calculating means 14 calculates the value of the elapsed time ET which it afterwards sends via its write output W to the storing means 13 where the calculated value of the elapsed time ET is stored in the table. The elapsed time ET is hence the duration of the arrival period for a number M of cells arriving at a certain point of the connection 18, namely at the cell arrival signalisation means 11.

Then, also the value of the timestamp TS in the table is replaced by the value of the overflow moment GTO from the time-calculating means 14 in that this value is sent via the write output W to the storing means 13.

For determining at an arbitrary point in time the used bandwidth CCR for the connection 18, the decision means 16 reads the values of the timestamp TS and of the threshold time interval THR from the table and further uses the actual time which it gets as the global time signal GT from the timing means 12. By subtracting the read value of the timestamp TS from the global time signal GT which hence represents the arbitrary point of time and by comparing the result of the subtraction with the value of the threshold time interval THR the decision means 16 determines if the timestamp TS is or is not longer ago from the arbitrary point of time GT than the threshold time interval THR. With other words it is tested whether GT-TS<THR or GT-TS>THR. The case when both values are equal can be assigned to one of the equations, whatever is preferred.

Since the timestamp TS is the point of time when the table was last updated, this test means that the decision means 16 finds out whether the stored value of the duration ET is at the arbitrary point of time GT older than the predetermined threshold period THR or not. The result V of this operation is transmitted from the decision means 16 to the definition means 15.

In the definition means 15 the used bandwidth CCR is finally defined. The definition depends on the result V in the following way: In the case, the result V shows that the stored duration ET is at the arbitrary point of time GT older than the predetermined threshold period THR, the bandwidth CCR is set to zero. In the opposite case the bandwidth CCR is defined to be the predetermined number M per the stored duration or elapsed time ET. The number M the definition means 15 gets directly from the counting means 10. The definition means finally delivers the value for the used bandwidth CCR to its output.

In reality, the definition means 15 may at any time be requested to output the actually used bandwidth CCR for the connection 18. Then the definition means 15 initiates the decision means 16 to deliver an actual value of the result V.

The value of the threshold time interval THR is usually pregiven and chosen such that it leads to acceptable results of the used bandwidth determination procedure. A basis for the choice of the threshold time interval THR can be the maximum bandwidth CCR or peak cell rate PCR allocated to the connection 18.

The background of the invention is the fact that a running counting process cannot be used for determining the actual bandwidth CCR but only the last stored values deriving from the last counting process. It may happen that the used bandwidth CCR during such a counting process varies so strongly that the predetermined number M of cells is reached only after a very long period of time after the point of time when the counter started its counting process or it is even not reached at all. Then the counting process is pertaining on and on and the last stored values in the table till remain valid for a state-of-the-art bandwidth determination process which simply would use the last calculated bandwidth CCR which here is calculated from the stored values in the table. However, the last-stored values of the table do not longer represent the correct value of the used bandwidth CCR, since the long counting process apparently proves that the cell rate has decreased. After storing values deriving from a counting process, these values certainly stay valid for a certain period of time. The more time passes after the storing, the higher is the probability that the bandwidth CCR has changed meanwhile and that the stored values are no longer representative for the actual bandwidth CCR.

To this adds the fact that when so much time has passed since the last storing procedure, this is an evidence for a pertinent counting process and for the assumption that the cell rate has decreased significantly.

With the invention, at some point in time after the last storing it is decided to not longer use the stored values for determining the actually used bandwidth CCR. This point in time is defined by the threshold time interval THR. Depending on the choice of the length of the threshold time interval THR the actual value of the used bandwidth CCR can be assumed to a low value, particularly zero.

For starting the process, an initialization may take place which gives the first values for the table. The threshold time interval THR is chosen according to a desired behavior of the bandwidth-determining means and the respective value of the threshold time interval THR is then stored in the table. This value is usually not amended during usage of the system, at least not as often as other parameters. However the value of the threshold time interval THR can be adapted to the connection 18, respectively to the expected or even experienced cell traffic on this connection 18. As first value of the timestamp TS the actual value of the global time signal GT is used and for the elapsed time ET the value of the threshold time interval THR or another high value may be stored.

While the counting process is running automatically, triggered by the arrivals of the cells, and hence the updating of the table content is triggered by the counter overflow, the determination process of the used bandwidth CCR is independent from time and from any of the previous processes. An external request for an output of the actual used bandwidth CCR on the connection 18 can come at any arbitrary time to the definition means 15 which with the described arrangement now gives at that arbitrary point of time a more accurate result.

Figure 2:
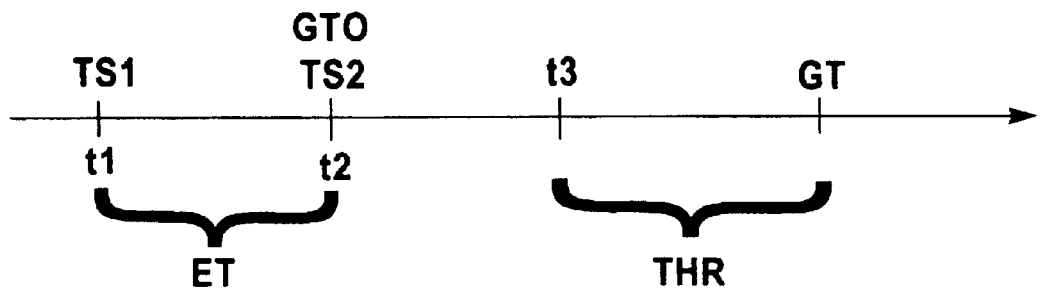
FIG. 2: an example of a time schedule for cells arriving at a connection.

In FIG. 2 an example for a time schedule on the connection 18 is given. The table is assumed to be preloaded e.g. with the initialization values. The time at which the table was last updated is the time $t_1$ whose value is also stored in the second column 33 as timestamp value $TS_1$. The counter was reset at that time $t_1$ and counts the predetermined number M of arriving cells. At the time $t_2$ the counter reaches the number M and has an overflow. The time-calculating means 14 is triggered to look at the global time signal GT and to store its value at that moment which gives the time $t_2$ as the overflow moment GTO.

Reading the timestamp value $TS_1$ from the table, the time-calculating means 14 calculates the duration ET of the elapsed time as $t_2$-$t_1$. This duration ET is then stored in the table and also the second column 33 is updated by overwriting the value of the timestamp $TS_1$ with a new value of the timestamp $TS_2=t_2$.

At an arbitrary point of time GT the definition means 15 is for example asked about the actually used bandwidth CCR on the connection 18. Therefor the decision means 16 reads the value of the timestamp $TS_2$ and the value of the threshold time interval THR from the table. The subsequent calculation checks whether $GT-TS_2=t_3<THR$. Since in the depicted case $t_3>t_2$, the stored value of the duration ET of the elapsed time is considered as too old and not longer applicable. The result V reaching the definition means 15 triggers the definition means 15 to output the value zero for the actually used bandwidth CCR. The arbitrary points of time GT may e.g. be determined by a background process that determines the bandwidth CCR on the connection at regular time intervals.

The above facts and processes are also valid for a plurality of connections 18. The arrangement of FIG. 1 needs only to be slightly modified, respectively enlarged. For every connection 18 a separate cell arrival signalization means 11, counting means 10 and time-calculating means 14 should be provided. The table is only amended in that for every connection 18 a separate row is provided. Hence, for every connection 18 only three values, namely the duration ET of the elapsed time, the timestamp TS and the threshold time interval THR are contained. It may even be considered to have only one value of the threshold time interval THR for a plurality of connections 18 which means that for this group of connections 18 only one value of the threshold time interval THR needs to be stored. The threshold time interval THR may even be only one value for all connections 18 and then may not even be needed as a stored value. Using a stored value for the threshold time interval THR has the advantage that this value can be changed at any time by writing a new value to the table. This renders the process very flexible. The arbitrary points of time GT may here e.g. be determined by a background process that determines the bandwidth CCR on the connections 18 sequentially and which starts again form the beginning when reaching the last connection 18, respectively entry in the table. Another modification of the described concept is the provision of several threshold time intervals THR for one connection 18. Then a stepwise and hence more differentiated assignment of the assumed bandwidth CCR is possible. Depending on in which threshold time interval THR the arbitrary point of time GT lies, a different bandwidth value can be defined in the definition means 15. These values should then best lie between the last calculated value based on the table content and zero.

It is also possible to choose not a fixed value but a different formula for determining the used bandwidth CCR. An example may be the choice of an additional factor α which is introduced in the formula CCR=M/ET which is used when the stored values are considered actual and makes it to CCR=Mα/ET. Since the actually used bandwidth CCR is lower than the last determined bandwidth CCR when the threshold time interval THR is exceeded, the additional factor cc will be smaller than 1.

The depicted arrangement is only an example. The several contained functions may be combined or separated, as long as the desired result is achieved. For instance, the table can be split up and need not be provided as a whole. The third column 43 may e.g. also be assigned to the decision means 16. Definition means 15 and decision means 16 may be unified as one single means. The counting means 10 may be replaced by any equivalent means that gives a signal everytime when the predetermined number M of cells is reached.

It may also be desirable to sum up the total used bandwidth over all connections 18, using the single values of the bandwidths CCR for the connections 18. This is also possible for one or several selected subsets of the connections 18, such as a subset for only the non-ABR connections.

What is claimed is:

1. Method for determining a currently used bandwidth (CCR) on a connection on which countable information-carrying units are transported, comprising the steps of:
   repetitively measuring a duration (ET) of an arrival period during which a predetermined number (M) of said units arrives at a certain point of said connection, said arrival period ending at a point of time (TS);
   storing a most recent duration (ET) and a most recent point of time (TS); and
   determining that the currently used bandwidth at a current point of time (GT) is said predetermined number (M) divided by said stored most recent duration (ET) if and only if the stored most recent point of time (TS) is not more than a predetermined threshold time interval (THR) before said current point of time/(GT).

2. Method according to claim and further comprising the step of:
   determining that the currently used bandwidth (CCR) is zero if the stored most recent point of time (TS) is more than the predetermined threshold time interval (THR) before said current point of time (GT).

3. Method according to claim 1 wherein the value of the predetermined threshold time interval (THR) is stored.

4. Method according to claim 1 wherein the method is used to determine a currently used bandwidth (CCR) on a plurality of connections to a same network switch.

5. Bandwidth determining apparatus, comprising:
   measuring apparatus for repetitively measuring a duration (ET) of an arrival period during which a predetermined number (M) of information-carrying units arrives at a certain point of a connection, said arrival period ending at a point of time (TS);
   storage apparatus for storing a most recent duration (ET) and a most recent point of time (TS); and
   decision apparatus for determining that the currently used bandwidth at a current point of time (GT) is said predetermined number (M) divided by said stored most recent duration (ET) if and only if the stored most recent point of time (TS) is not more than a predetermined threshold time interval (THR) before said current point of time (GT).

6. Bandwidth determining apparatus according to claim 5 wherein the decision apparatus determines that the currently used bandwidth (CCR) is zero if the stored most recent point of time (TS) is more than the predetermined threshold time interval (THR) before said current point of time (GT).

7. Bandwidth determining apparatus according to claim 5 wherein the value of the predetermined threshold time interval (THR) is stored.

8. Bandwidth determining apparatus according to claim 5 wherein the measuring apparatus measures a currently used bandwidth (CCR) on a plurality of connections to a same network switch.

* * * * *